United States Patent
Ido (10) Patent No.: US 9,928,018 B2
(45) Date of Patent: Mar. 27, 2018

(54) INFORMATION PROCESSING APPARATUS AND CONTROL METHOD THEREOF, FOR A DRAWING CONTROL TECHNIQUE OF A PRINTER DRIVER

(71) Applicant: CANON KABUSHIKI KAISHA, Tokyo (JP)

(72) Inventor: Yoko Ido, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/357,953

(22) Filed: Nov. 21, 2016

(65) Prior Publication Data
US 2017/0153859 A1   Jun. 1, 2017

(30) Foreign Application Priority Data
Nov. 26, 2015   (JP) ................... 2015-230775

(51) Int. Cl.
*G06F 3/12*  (2006.01)
*G06K 15/02*  (2006.01)

(52) U.S. Cl.
CPC .......... *G06F 3/1298* (2013.01); *G06F 3/1206* (2013.01); *G06F 3/1208* (2013.01); *G06F 3/1242* (2013.01); *G06F 3/1246* (2013.01); *G06F 3/1254* (2013.01); *G06F 3/1276* (2013.01); *G06F 3/1285* (2013.01); *G06K 15/1807* (2013.01); *G06K 15/1813* (2013.01); *G06K 15/1855* (2013.01)

(58) Field of Classification Search
CPC .................................................... G06F 3/1298
USPC ........................................................... 358/1.2
See application file for complete search history.

(56) References Cited

U.S. PATENT DOCUMENTS

| | | | | |
|---|---|---|---|---|
| 2005/0254079 | A1* | 11/2005 | Han | G06F 3/1204 358/1.13 |
| 2008/0186516 | A1* | 8/2008 | Tayama | H04N 1/2307 358/1.2 |
| 2009/0097047 | A1* | 4/2009 | Mitsui | G06F 3/1208 358/1.9 |

FOREIGN PATENT DOCUMENTS

JP        2000-222152 A        8/2000

* cited by examiner

*Primary Examiner* — Jacky Zheng
(74) *Attorney, Agent, or Firm* — Canon U.S.A., Inc. IP Division (57) ABSTRACT

An information processing apparatus includes a graphics device interface application configured to issue graphics device interface drawing commands in accordance with a print instruction, a conversion module configured to convert the graphics device interface drawing commands to extensible markup language paper specification drawing commands, and a printer driver configured to generate print data of a document file corresponding to the print instruction by using the extensible markup language paper specification drawing commands as an input. In the information processing apparatus, when converting drawing commands for a pattern drawing included in the document file from a graphics device Interface format to an extensible markup language paper specification format, the conversion module sets a pattern resolution of the pattern drawing on the basis of external information.

12 Claims, 12 Drawing Sheets

```
void WINAPI Draw(PDRAWPARAM pDrawParam)
{
    ⋮

HBITMAP bitmap = GDI::LoadBitmap( ::GetModuleHandle(NULL),
MAKEINTRESOURCE(IDB1) );
    LOGBRUSH br;
    br.lbStyle = BS_PATTERN;        701
    br.lbColor = 0;
    br.lbHatch = (ULONG_PTR)bitmap;
    HBRUSH brush = GDI::CreateBrushIndirect(&br);
    GDI::SelectObject(pDrawParam->hDC, brush);
    GDI::Rectangle(pDrawParam->hDC, 920, 400, 3120, 4400);
    ⋮
}
```

FIG. 7B

```
<Path Data="F 1 M 68,18.72 L 275.52,18.72 275.52,396.32 68,396.32 Z">
    <Path.Fill>
        <ImageBrush Viewbox="0,0,8,8" Viewport="0,0,5.12,5.12" TileMode="Tile"
ImageSource="../Resources/Images/1.PNG" ViewboxUnits="Absolute"
ViewportUnits="Absolute"/>
                                            702
    </Path.Fill>
</Path>
    ⋮
```

```
*Feature: PatternResolution
{
        *Name: "Pattern Resolution"
        *DefaultOption: 300DPI
        *Option: 300DPI
        {
                *Name: "300 x 300" =DOTS_PER_INCH
                *PatternDPI: PAIR(300, 300)
        }
        *Option: 600DPI
        {
                *Name: "600 x 600" =DOTS_PER_INCH
                *PatternDPI: PAIR(600, 600)
        }
}
```

FIG. 9B

```
[DriverRender]
PageOutputQuality.Draft=MxdcImageType.JPEGHigh
PageOutputQuality.Normal=MxdcImageType.JPEGLow
PageOutputQuality.High=MxdcImageType.PNG
OutputFormat="image/pwg-raster"
PatternResolution.Normal=300
PatternResolution.High=600

```
<?xml version="1.0" encoding=" UTF-8"?>
<psf:PrintTicket xmlns:psf="http://schemas.microsoft.com/windows/2003/08/printing/printschemaframework"
xmlns:xsi="http://www.w3.org/2001/XMLSchema-instance"
xmlns:xsd="http://www.w3.org/2001/XMLSchema" version="1"
xmlns:ns0000="http://www.canon.com/ns/printschema/oip/v200"
xmlns:psk="http://schemas.microsoft.com/windows/2003/08/printing/printschemakeywords">
 .
 .
<psf:Feature name="ns0000.JobPatternResolution">
 <psf:Option>
  <psf:ScoredProperty name="psk:ResolutionX">
   <psf:Value xsi:type="xsd:integer">300</psf:Value>
  </psf:ScoredProperty>
  <psf:ScoredProperty name="psk:ResolutionY">
   <psf:Value xsi:type="xsd:integer">300</psf:Value>
  </psf:ScoredProperty>
 </psf:Option>
</psf:Feature>
 .
 .
</PrintTicket>
```

FIG. 12

```
*GPDSpecVersion: "1.0"
*GPDFileName: "Model1gpd"
    :
* PatternResolution: 300
```

INFORMATION PROCESSING APPARATUS AND CONTROL METHOD THEREOF, FOR A DRAWING CONTROL TECHNIQUE OF A PRINTER DRIVER

BACKGROUND OF THE INVENTION

Field of the Invention

The present invention relates to a drawing control technique of a printer driver.

Description of the Related Art

Printing systems from Microsoft Corporation have used a graphics engine called the graphics device interface (GDI). A printing flow using the GDI has been as follows:

(1) In accordance with a print instruction from a user, a GDI application calls a GDI service function group and issues GDI drawing commands;

(2) The issued GDI drawing commands are spooled in a data format called the enhanced metafile (EMF), and passed to a printer driver for GDI (hereinafter referred to as "GDI driver"); and (3) The GDI driver converts drawing data formed by the GDI drawing commands (hereinafter referred to as "GDI drawing data") to print data (so-called page description language (PDL) data) interpretable by a printing apparatus, and outputs the print data to the printing apparatus.

Such a processing flow that involves printing from the GDI application via the GDI driver will hereinafter be referred to as a "GDI print path". Recently, a new printing flow called an "XPS print path." has been added to the GDI print path. The XPS is an extensible markup language (XML)-based electronic document format and an abbreviation for the XML paper specification. In the XPS print path, an application that supports XPS (i.e., XPS application) generates XPS drawing data, which is converted to print data by a printer driver for XPS (hereinafter referred to as "XPS driver") and output to the printing apparatus.

The GDI print path and the XPS print path are not exclusive to each other. For example, GDI drawing data generated by the GDI application using GDI can be converted to XPS drawing data, which can then be converted to print data by the XPS driver. In the case of printing from the GDI application using the XPS driver, conversion from GDI drawing data to XPS drawing data is done by a conversion module called the Microsoft XPS document writer (MXDW).

Figure 1:
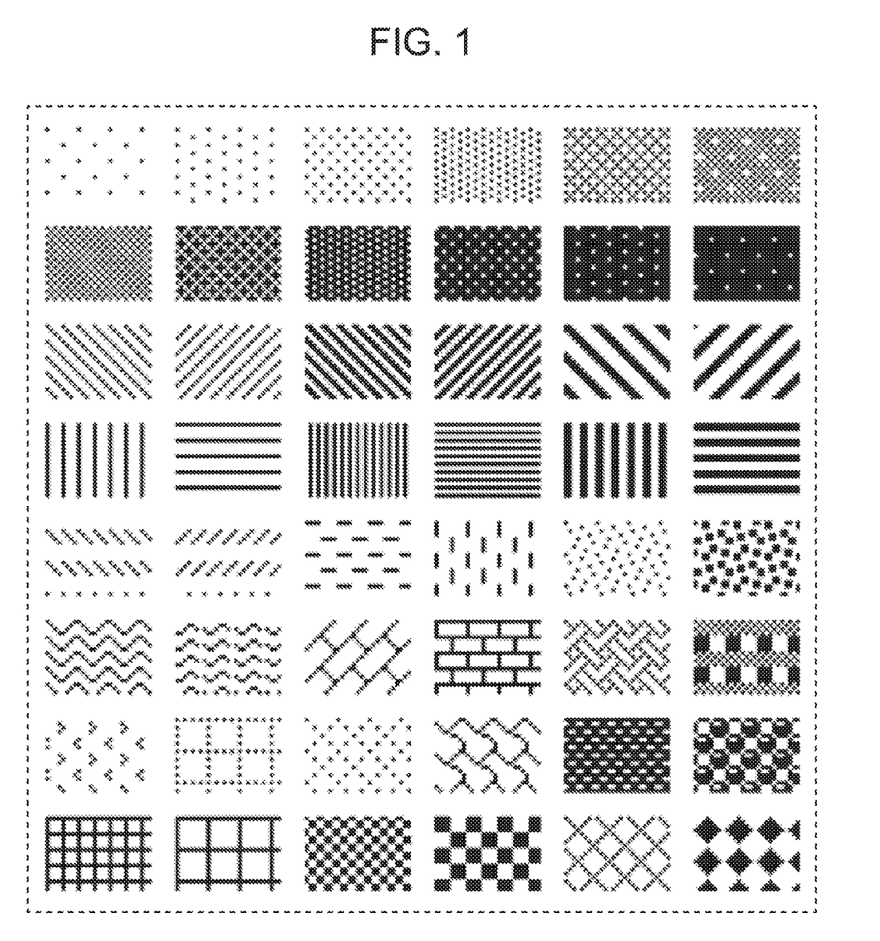
FIG. 1 illustrates patterns used in a pattern drawing.

Print settings in the GDI driver include a "pattern resolution setting" for specifying the resolution of a pattern drawing in printing of a document file including the pattern drawing. The pattern drawing refers to a drawing created by filling a figure with one of various repeating drawing units called patterns. FIG. 1 illustrates various patterns used in a pattern drawing. After selecting a pattern, the user specifies a resolution, such as 300 dpi or 600 dpi, as the "pattern resolution setting", so that the selected pattern can be drawn with desired fineness (e.g., at the specified resolution). The "pattern resolution setting" is also used for the purpose of avoiding unevenness caused by interference between a pattern and a halftone screen used in printing. Japanese Patent Laid-Open No. 2000-222152 discloses a technique in which, in creating a pattern drawing, the occurrence of moiré is avoided by enlarging or reducing a pattern in consideration of interference between the pattern and a halftone screen.

However, print settings of the XPS driver do not include the "pattern resolution setting" described above. When GDI drawing data from the GDI application is printed by the XPS driver, the MXDW converts the GDI drawing data to XPS drawing data always at a fixed resolution of a pattern drawing, such as 150 dpi. In this case, if a document file created by the GDI application includes a pattern drawing, the pattern roughness in the pattern drawing varies depending on whether printing is performed via the GDI driver or the XPS driver.

SUMMARY OF THE INVENTION

An information processing apparatus according to an aspect of the present invention includes a graphics device interface application configured to issue graphics device interface drawing commands in accordance with a print instruction, a conversion module configured to convert the graphics device interface drawing commands to extensible markup language paper specification drawing commands, and a printer driver configured to generate print data of a document file corresponding to the print instruction by using the extensible markup language paper specification drawing commands as an input. In the information processing apparatus, when converting drawing commands for a pattern drawing included in the document file from a graphics device Interface format to an extensible markup language paper specification format, the conversion module sets a pattern resolution of the pattern drawing on the basis of external information.

Further features of the present invention will become apparent from the following description of exemplary embodiments with reference to the attached drawings.

DESCRIPTION OF THE EMBODIMENTS

Embodiments of the present invention will be described in detail with reference to the drawings. The embodiments described below do not limit the scope of the invention, and not all combinations of features described in the embodiments are indispensable for the solution of the invention.

First Embodiment (Overall System Configuration)

Figure 2:
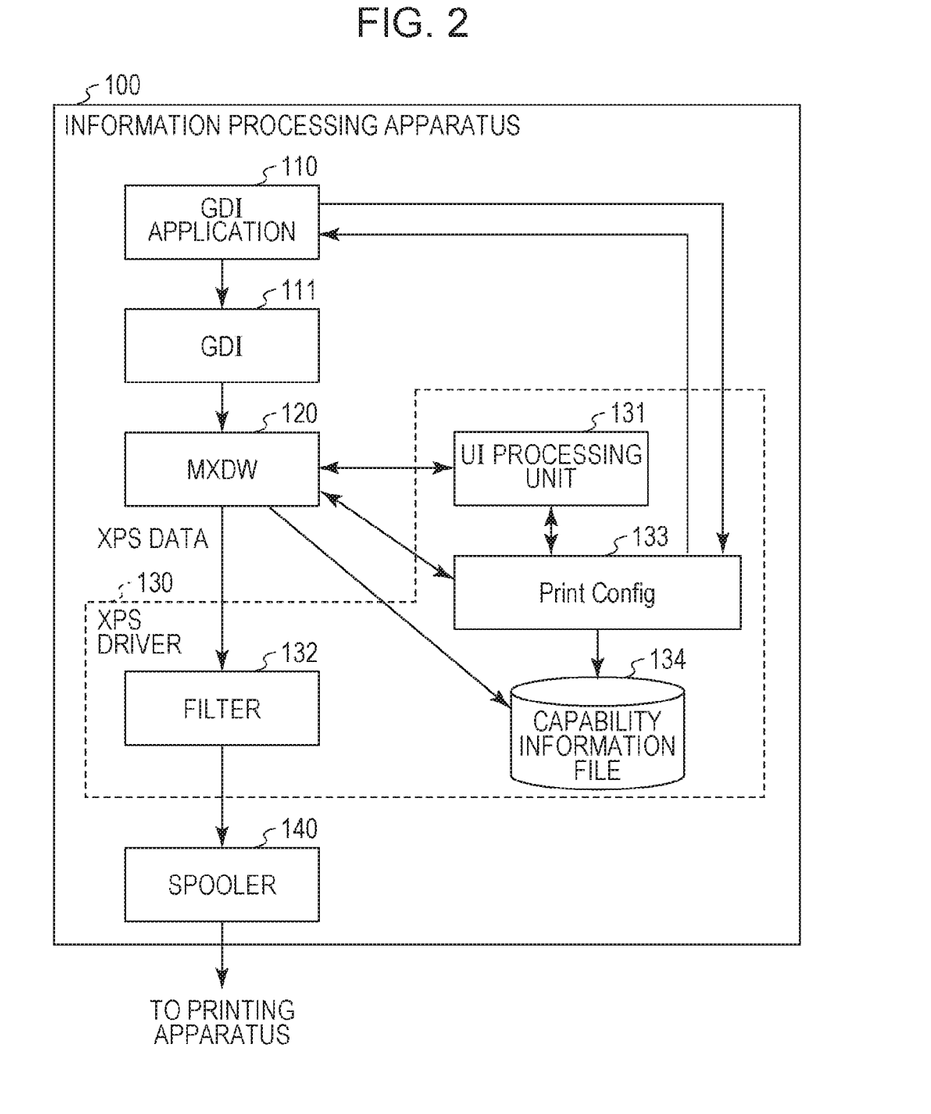
FIG. 2 is a functional block diagram illustrating a configuration of an information processing apparatus that generates print data.

FIG. 2 is a functional block diagram illustrating a configuration of an information processing apparatus that generates print data according to the present embodiment. An operating system (not shown, hereinafter referred to as OS) is installed on an information processing apparatus 100. The present embodiment assumes that the OS is Windows (registered trademark). In the information processing apparatus 100, a GDI application 110, which is software that generates drawing data, runs on the OS. In response to a print instruction from a user, the GDI application 110 calls a GDI function, and generates GDI drawing data in accordance with an object attribute (e.g., text, graphics, or image) by using a GDI 111. The GDI 111 is generally referred to as a graphics engine. The GDI drawing data, which cannot be directly input to an XPS driver 130, is transmitted to an MXDW 120.

The MXDW 120 is a GDI-to-XPS conversion unit. Specifically, the MXDW 120 is a module configured to convert GDI drawing data to XPS drawing data and provided by the OS. The MXDW 120 of the present embodiment is capable of setting a pattern resolution, on the basis of external information, for conversion of drawing commands for a patter n drawing from GDI drawing commands to XPS drawing commands. In relation to this, the MXDW 120 receives an inquiry about the version of the MXDW 120 from the XPS driver 130, sends a request to the XPS driver 130 for conversion of DEVMODE to PrintTicket, and refers to print setting information.

The XPS driver 130 is a printer driver that accepts only XPS drawing data as input drawing data. The XPS driver 130 includes a user interface (UI) processing unit 131, a filter 132, a Print Config 133, and a capability information file 134.

The UI processing unit 131 performs processing related to a user interface of the XPS driver 130, displays a UI screen, and stores print setting information input by the user via the UI screen. On the basis of the print setting information set by the user, the filter 132 generates, from the XPS drawing data input from the MXDW 120, print data (PDL data) interpretable by a printing apparatus. That is, the filter 132 serves as a PDL data generating unit. The Print Config 133 exchanges information, such as PrintTicket and DEVMODE, with other modules. Also, the Print Config 133 refers to the capability information file 134 (described below) to acquire necessary information, and converts DEVMODE to PrintTicket. The capability information file 134 is a data file that describes information related to the capabilities and functions of the printing apparatus. Examples of the capability information file 134 include a generic printer description (GPD) file and a manifest file. The GPD file is data that contains various types of print-related setting information referred to by the XPS driver 130. Examples of the print-related setting information include the number of copies, sheet orientation, sheet size, sheet type, single or double sided printing, feeding method, and drawing resolution. The manifest file is data that describes, in text format, setting information related to the XPS driver 130. Examples of the setting information related to the XPS driver include information about the file name and the output data format of the GPD file. The print data generated by the XPS driver 130 is transmitted via a spooler 140 to the printing apparatus, and printed and output from the printing apparatus.

Figure 3:
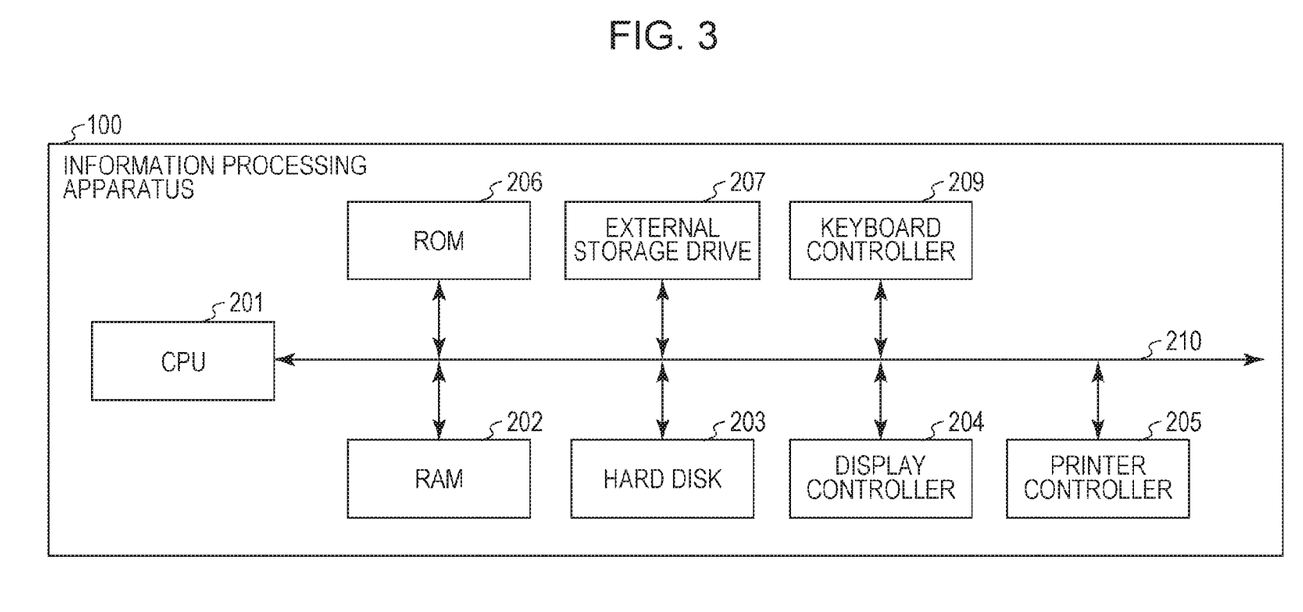
FIG. 3 is a block diagram illustrating a hardware configuration of the information processing apparatus.

FIG. 3 is a block diagram illustrating a hardware configuration of the information processing apparatus 100. Note that the configuration illustrated in FIG. 3 is merely an example. The information processing apparatus 100 may be a single device, or may be a system made up of a plurality of devices connected to one another via a network, such as a local area network (LAN) or wide area network (WAN). The information processing apparatus 100 implements various processing when a central processing unit (CPU) 201 executes a processing program stored in a read-only memory (ROM) 206 or hard disk 203, and controls the overall operation of components connected to a system bus 210. The CPU 201 executes various processing, such as opening a pre-registered window, on the basis of a command indicated by a mouse cursor. For example, when the user gives an instruction to execute printing, the CPU 201 opens a print setting window and makes various settings for the XPS driver 130, including selection of a pattern resolution (described below). A random-access memory (RAM) 202 serves as a main memory and a work area for the CPU 201. The hard disk 203 stores, for example, the OS, a boot program, various applications, font data, user files, and editing files. The XPS driver 130 is also stored in the hard disk 203. A display controller 204 controls the display operation of a display (not shown). A printer controller 205 is connected via a predetermined bidirectional interface (not shown) to the printing apparatus to control communication therewith. The CPU 201 executes, for example, extraction (rasterization) of an outline font to a display information RAM set on the RAM 202 and enables WYSIWYG on the display. An external storage drive 207 controls access to a storage medium, such as a compact disc (CD) or a digital versatile disc (DVD). A keyboard controller 209 controls a key input from a keyboard or a pointing device.

Figure 4:
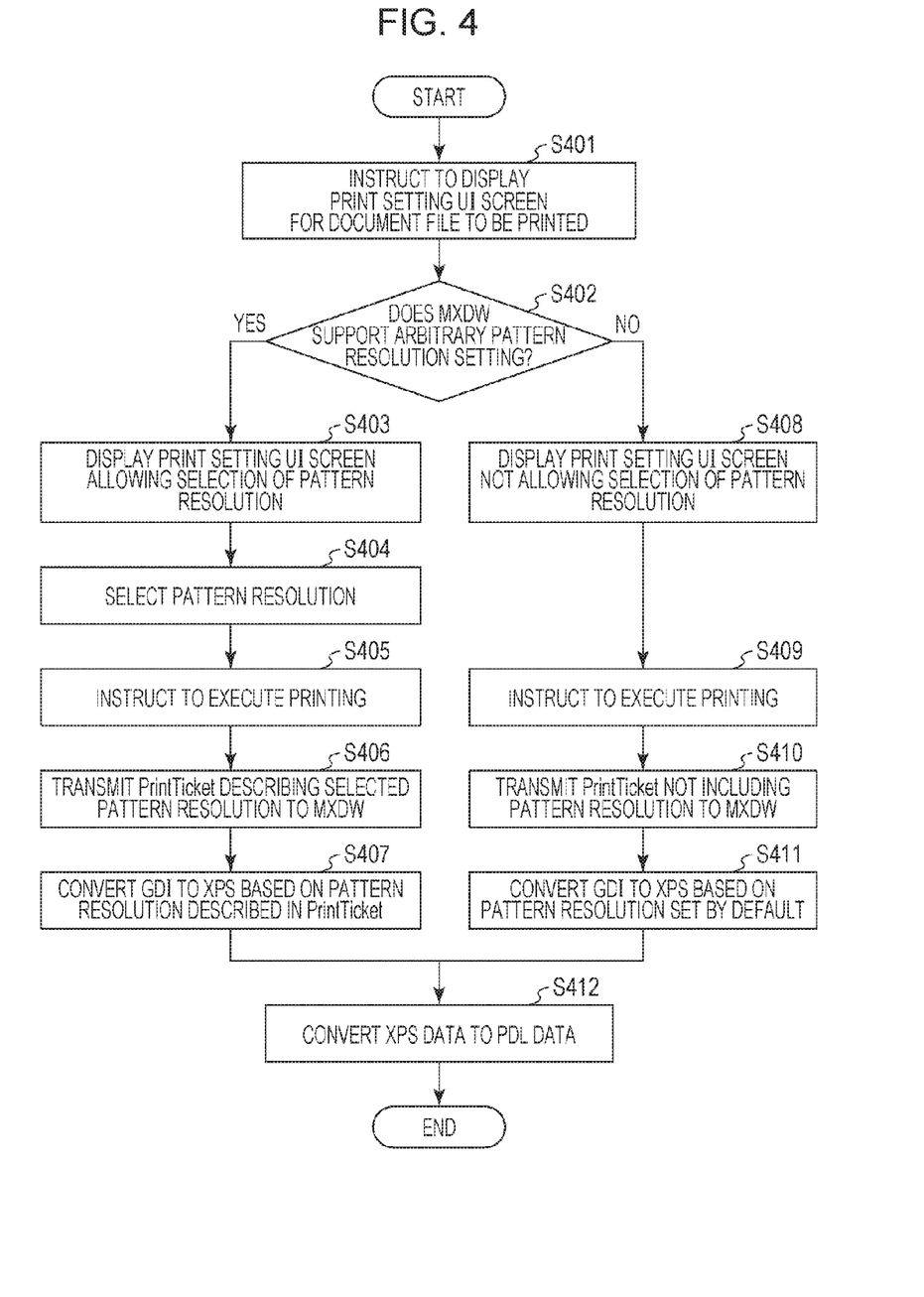
FIG. 4 is a flowchart illustrating a flow of how print data of a document file created by a GDI application is generated by an XPS driver according to a first embodiment.

With reference to the flowchart of FIG. 4, a general flow of how print data (PDL data) of a document file created by the GDI application 110 is generated by the XPS driver 130 according to the present embodiment will be described.

In step S401, the user gives an instruction from the GDI application 110 to display a UI screen (print setting UI screen) for setting various print settings for a document file to be printed. The following description assumes that the document file to be printed includes a pattern drawing.

In response to the display instruction described above, a determination is made in step S402 as to whether the installed MXDW 120 supports an arbitrary pattern resolution setting. This determination may be made, for example, by sending an inquiry to the MXDW 120 using a dedicated application programming interface (API). Alternatively, version information of an MXDW that can support an arbitrary pattern resolution setting may be prepared and stored in advance, so that the determination can be made by acquiring version information from the MXDW 120 and comparing it with the version information stored in advance. If it is determined in step S402 that the MXDW 120 supports an arbitrary pattern resolution setting, the process proceeds to steps S403 to S407. On the other hand, if the MXDW 120 does not support an arbitrary pattern resolution setting, the process proceeds to steps S408 to S411.

First, the process (steps S403 to S407) performed when the MXDW 120 supports an arbitrary pattern resolution setting will be described.

Figure 5:
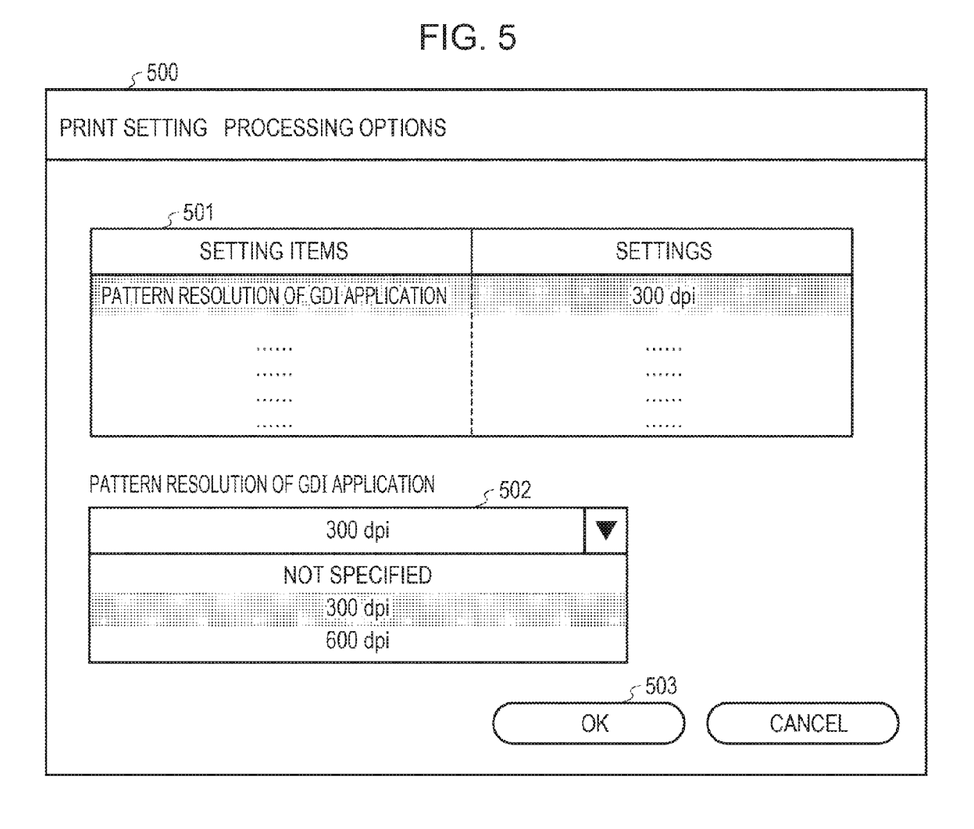
FIG. 5 illustrates a print setting UI screen which allows selection of a pattern resolution.

In step S403, a print setting UI screen which allows selection of a pattern resolution is displayed on the display (not shown). FIG. 5 illustrates a print setting UI screen which allows selection of a pattern resolution. In a UI screen 500 illustrated in FIG. 5, a setting item column 501 shows a list of print-related items that can be set by the user. In the list of items shown in the setting item column 501, "pattern resolution of GDI application" (highlighted in FIG. 5) is currently selected by the user. In an advanced setting column 502 for advanced setting of the item selected in the setting item column 501, options selectable for "pattern resolution of GDI application" are displayed as a pull-down menu. In this example, three options "not specified", "300 dpi", and "600 dpi" are displayed, and "300 dpi" is selected from them. If "not specified" is selected, the processing is performed at a fixed default pattern resolution (e.g., 150 dpi) of the MXDW 120. The options for the pattern resolution shown in FIG. 5 are merely examples and are not limited to them.

In step S404, the user selects a resolution on the print setting UI screen displayed in step S403. When the user presses an OK button 503 with the resolution selected, the resolution to be applied to the pattern drawing is determined.

In step S405, the user gives an instruction from the GDI application 110 to execute printing. In response to this print execution instruction, GDI drawing commands corresponding to the document file to be printed are issued via the GDI 111, and drawing data formed by GDI drawing commands corresponding to each object (GDI drawing data) is input to the MXDW 120. At the same time, information of the pattern resolution selected in step S404 (i.e., 300 dpi in the example described above) is transmitted to the MXDW 120.

In step S406, a PrintTicket including information of the pattern resolution selected in step S404 is generated by the XPS driver 130 and transmitted to the MXDW 120.

Figure 6A:
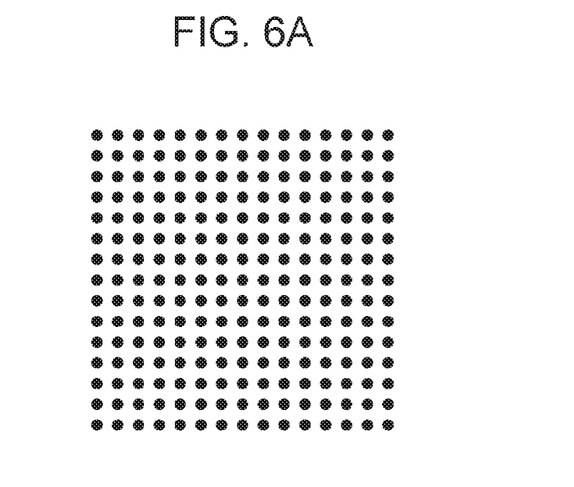
FIG. 6A illustrates a pattern drawing included in a document file to be printed.
Figure 6B:
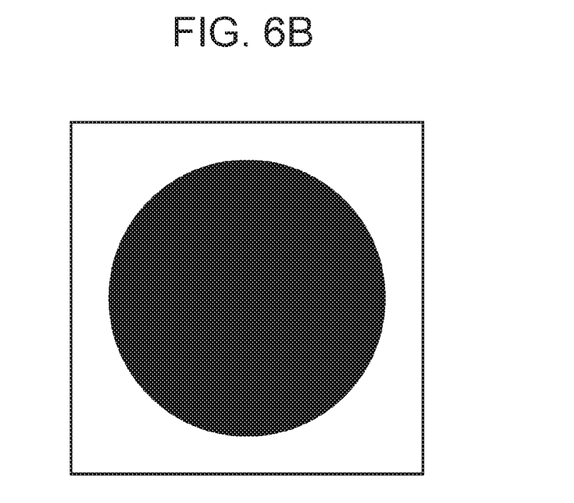
FIG. 6B illustrates a bitmap image of a pattern which is drawn repeatedly in a figure of the pattern drawing.
Figure 7A:
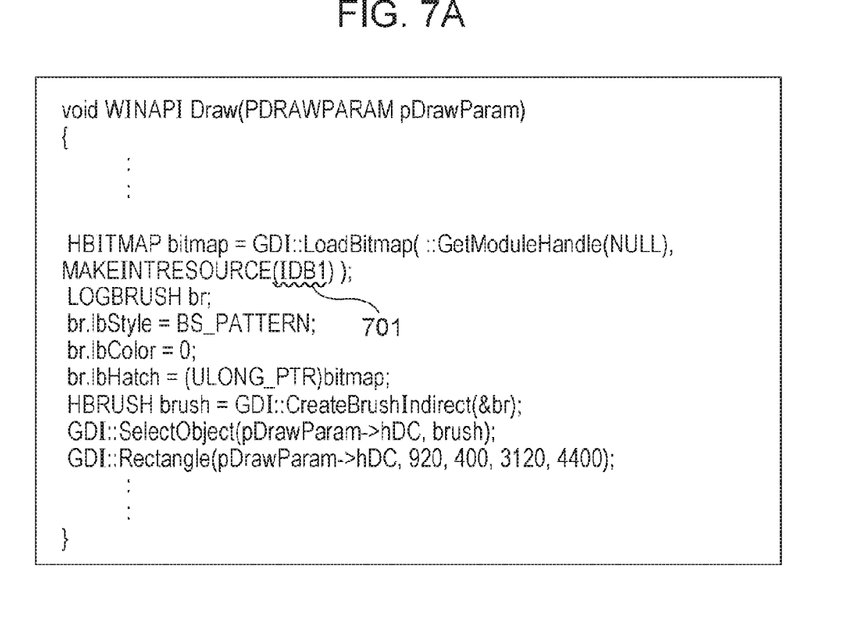
FIG. 7A illustrates GDI bitmap brush drawing commands.
Figure 7B:
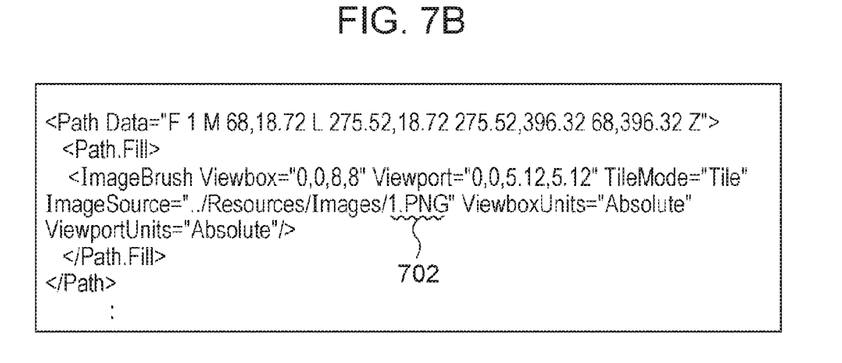
FIG. 7B illustrates XPS tile image drawing commands converted from the GDI bitmap brush drawing commands.

In step S407, the MXDW 120 converts GDI drawing data to XPS drawing data. FIG. 6A illustrates a pattern drawing included in a document file to be printed, and FIG. 6B illustrates a bitmap image of a pattern which is drawn repeatedly in a figure of the pattern drawing. In this example, the MXDW 120 converts GDI bitmap brush drawing commands specifying the black circular pattern illustrated in FIG. 6B to XPS tile image drawing commands. FIG. 7A illustrates GDI bitmap brush drawing commands corresponding to the pattern drawing illustrated in FIG. 6A, and "IDB1" indicated by reference numeral 701 is a portion that specifies the black circle (see FIG. 6B), which is a repeating unit. FIG. 7B illustrates XPS tile image drawing commands converted from the GDI bitmap brush drawing commands illustrated in FIG. 7A. In FIG. 7B, "1.PNG" indicated by reference numeral 702 is a portion that specifies the black circle (see FIG. 6B), which is a repeating unit. Then, the pattern resolution (300 dpi here) described in the PrintTicket is applied to the conversion described above. The XPS drawing data obtained by the conversion is input to the XPS driver 130.

The process is performed in this manner when the MXDW 120 supports an arbitrary pattern resolution setting. Next, the process (steps S408 to S411) performed when the MXDW 120 does not support an arbitrary pattern resolution setting will be described.

In step S408, a print setting UI screen which does not allow selection of a pattern resolution is displayed on the display (not shown). Examples of the UI screen which does not allow selection of a pattern resolution include a screen in which the item "pattern resolution of GDI application" in the setting item column 501 is hidden or grayed out. Alternatively, the item "pattern resolution of GDI application" in the setting item column 501 may be displayed, and the option "not specified" corresponding to the default setting in the pull-down menu in the advanced setting column 502 may be made fixed and unchangeable.

In step S409, the user gives an instruction from the GDI application 110 to execute printing. In response to this print execution instruction, GDI drawing commands corresponding to the document file to be printed are issued via the GDI 111. Then drawing data formed by GDI drawing commands (GDI drawing data) is input to the MXDW 120. At the same time, information indicating that the pattern resolution is not specified (i.e., the default setting will be used) is transmitted to the MXDW 120.

In step S410, a PrintTicket not including pattern resolution information is generated by the XPS driver 130 and transmitted to the MXDW 120.

In step S411, the MXDW 120 converts GDI drawing data to XPS drawing data. Since the PrintTicket does not describe pattern resolution information, pattern drawing commands are converted in accordance with the default setting (e.g., 150 dpi) in the MXDW 120. The XPS drawing data obtained by the conversion is input to the XPS driver 130.

The process is performed in this manner when the MXDW 120 does not support an arbitrary pattern resolution setting.

Then in step S412, the XPS driver 130 converts the XPS drawing data to PDL data interpretable by the printing apparatus. The PDL data is spooled by the spooler 140 and then transmitted to the printing apparatus.

This is the general flow of how print data (PDL data) of the document file, including a pattern drawing, created by the GDI application 110 is generated by the XPS driver 130.

With reference to the sequence diagram of FIG. 8, a printing process performed when the MXDW 120 supports an arbitrary pattern resolution setting will be described in detail. A series of steps described below is implemented when a predetermined program stored in the ROM 206 is expanded in the RAM 202 and executed by the CPU 201.

In step S801, the GDI application 110 sends a request to the Print Config 133 in the XPS driver 130 to start a print setting UI. This corresponds to the operation in step S401 in the flow of FIG. 4 described above.

In step S802, the Print Config 133 refers to the capability information file 134 and acquires capability information (i.e., information about settable functions etc.) of the printing apparatus. Here, the Print Config 133 also acquires information about a pattern resolution setting. FIG. 9A illustrates a GPD file as an example of the capability information file 134, and gives an excerpt (Feature: PatternResolution) describing a pattern resolution setting. This example shows that 300 dpi is set in "DefaultOption", and 300 dpi and 600 dpi are selectable in "Option". FIG. 9B illustrates a manifest file as an example of the capability information file 134, and gives an excerpt (DriverRender) describing a pattern resolution setting. This example shows that normal (Normal) and high quality (High) are selectable in "PatternResolution", and 300 dpi and 600 dpi are specified for Normal and High, respectively. Although the GPD file and the manifest file are described as sources of capability information about the printing apparatus, any other files may be referred to, as long as the same information can be acquired.

Figure 10:
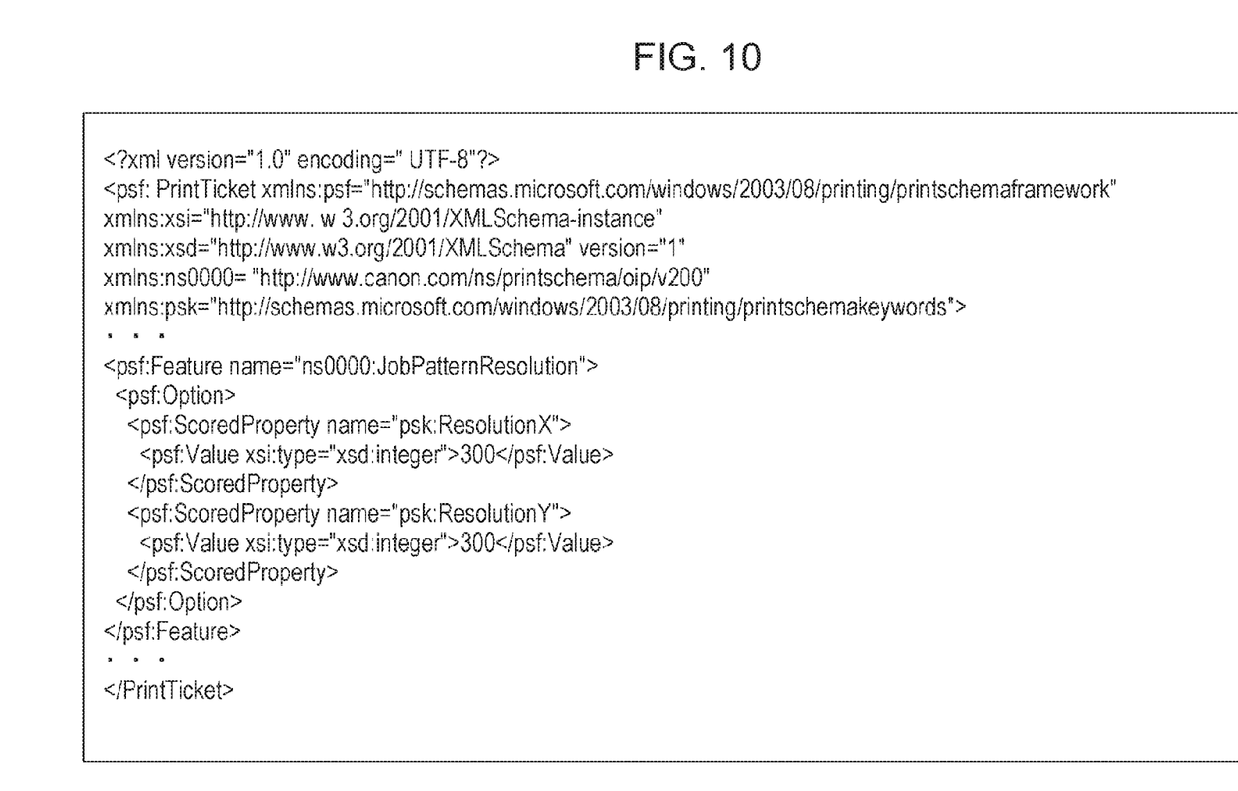
FIG. 10 illustrates a PrintTicket.

In step S803, the Print Config 133 passes the pattern resolution setting information to the UI processing unit 131 using a PrintTicket or PrintCapability. In this example, the pattern resolution setting information is described in the PrintTicket. FIG. 10 illustrates a PrintTicket, and gives an excerpt (psf:Feature name="ns0000:JobPatternResolution") related to the pattern resolution setting. This PrintTicket is created on the basis of capability information analyzed by the Print Config 133 by reading a GPD file or the like. Although FIG. 10 only shows "Option" where the resolution of a pattern drawing in the X and Y directions (psk: ResolutionX, psk:Resolution) is 300 dpi, another "Option" where the resolution is 600 dpi is described in a similar manner. The PrintTicket that describes the pattern resolution setting information as described above is transmitted from the Print Config 133 to the UI processing unit 131.

In step S804, the UI processing unit 131 sends an inquiry to the MXDW 120 as to whether the MXDW 120 supports the function of setting an arbitrary pattern resolution. As described above, the inquiry may be made, for example, by a dedicated API or by acquiring and comparing version information.

In step S805, the MXDW 120 returns a response to the inquiry to the UI processing unit 131.

In step S806, the UI processing unit 131 displays, on the display, a print setting UI screen (see FIG. 5) which allows selection of an arbitrary pattern resolution. Note that the print setting us screen 500 illustrated in FIG. 5 is configured to allow selection from a plurality of pattern resolutions. If there is only one selectable pattern resolution, the pull-down menu in the advanced setting column 502 in the UI screen 500 may be hidden.

In step S807, the user selects a desired pattern resolution on the displayed print setting UI screen.

In step S808, the UI processing unit 131 transmits, to the Print Config 133, the PrintTicket describing information of the pattern resolution selected by the user.

In step S809, the Print Config 133 transmits, via a DEVMODE to the GDI application 110, the information of the pattern resolution selected by the user.

In step S810, the user gives an instruction from the GDI application 110 to execute printing of a document file to be printed.

In response to this print execution instruction, in step S811, the GDI application 110 transmits, to the MXDW 120, not only image data (GDI drawing data) of the document file to be printed, but also the information of the pattern resolution selected by the user and described in the DEVMODE.

In step S812, the MXDW 120 sends a request to the Print Config 133 to convert the DEVMODE to a PrintTicket.

In response to the conversion request from the MXDW 120, the Print Config 133 converts the DEVMODE to a PrintTicket in step S813.

In step S814, the Print Config 133 transmits the PrintTicket to the MXDW 120.

In step S815, the MXDW 120 converts GDI drawing data to XPS drawing data. For the pattern drawing, GDI drawing commands are converted to XPS drawing commands in accordance with the pattern resolution selected by the user and described in the PrintTicket.

In step S816, the MXDW 120 transmits, to the filter 132, the XPS drawing data converted from the GDI drawing commands.

In step S817, on the basis of the XPS drawing data received, the filter 132 generates data (PDL data) written in PDL and interpretable by the printing apparatus.

In step S818, the filter 132 spools the generated PDL data to the spooler 140.

In step S819, the spooler 140 transmits the PDL data to the printing apparatus.

In step S820, the printing apparatus performs processing (printing) to form an image on a recording medium (sheet) in accordance with the received PDL data.

The printing process described above is one that is performed when the MXDW 120 supports an arbitrary pattern resolution setting.

As described above in the present embodiment, when a document file created by the GDI application is printed via the XPS driver, a pattern drawing can be printed at a desired resolution different from a resolution fixed in the MXDW. Additionally, since a print result equivalent to that from the GDI driver can be obtained by the XPS driver, even if a document file previously created by the GDI application is printed by the XPS driver, the resulting pattern drawing is not degraded. Also, since selection from a plurality of pattern resolutions can be made, it is possible to solve the above-described problem of unevenness caused by interference with a halftone screen.

Second Embodiment

In the first embodiment described above, the MXDW 120 that supports an arbitrary pattern resolution setting converts GDI drawing commands for a pattern drawing to XPS drawing commands in accordance with a user-selected pattern resolution specified in a PrintTicket. However, if the MXDW 120 supports only one pattern resolution setting, there is no need to allow the user to select a pattern resolution. Accordingly, a second embodiment describes a configuration in which the user does not set a pattern resolution via the UI screen, and the MXDW 120 converts GDI drawing commands for a pattern drawing to XPS drawing commands by directly referring to pattern resolution information described in a capability information file.

The same description as the first embodiment will be omitted or simplified, and differences from the second embodiment will be mainly described here.

Figure 11:
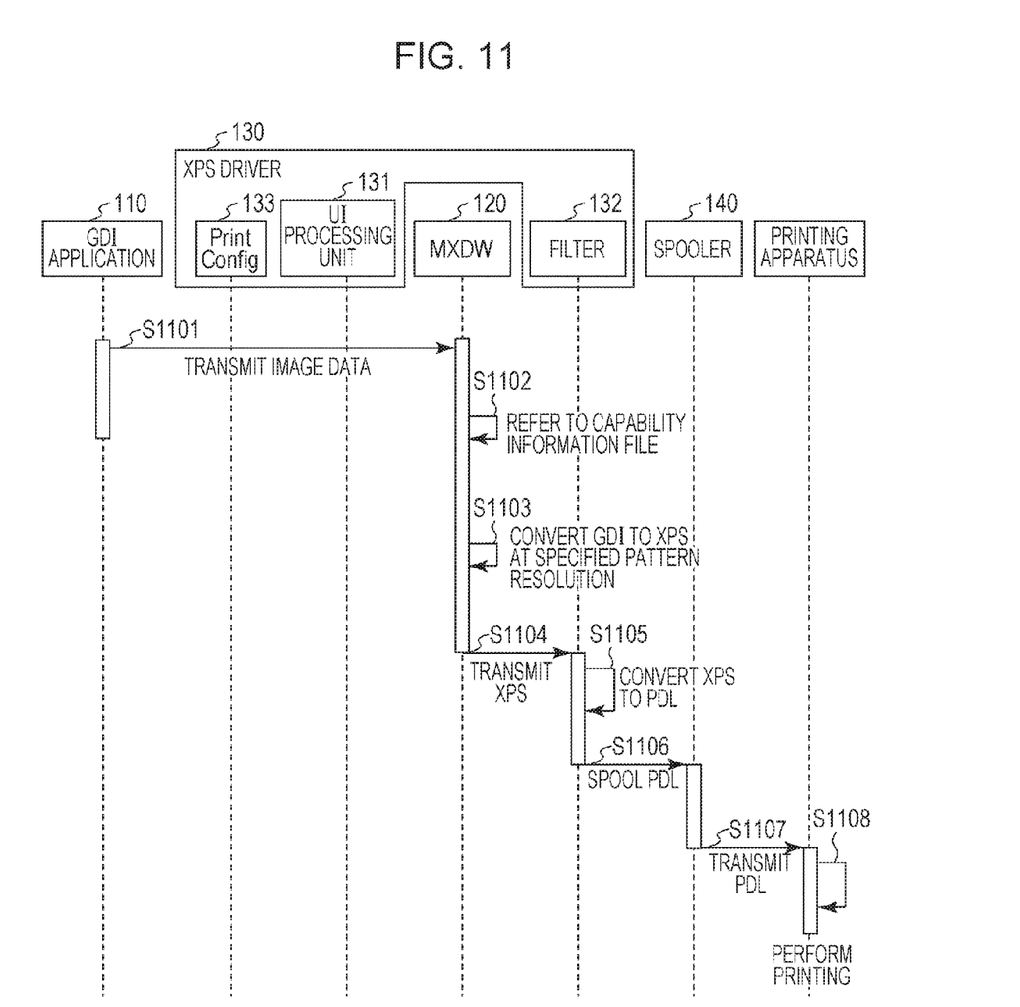
FIG. 11 is a sequence diagram illustrating a printing process performed when the MXDW supports only one fixed pattern resolution setting according to a second embodiment.

With reference to the sequence diagram of FIG. 11, a printing process performed when the MXDW 120 supports only one fixed pattern resolution setting will be described in detail. A series of steps described below is implemented when a program stored in the ROM 206 is predetermined expanded in the RAM 202 and executed by the CPU 201.

In response to a print execution instruction from the user, in step S1101, the GDI application 110 transmits image data (GDI drawing data) of a document file to be printed to the MXDW 120.

Figure 12:
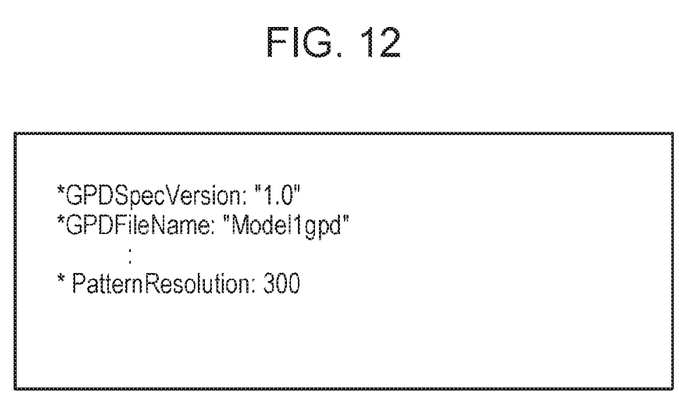
FIG. 12 illustrates a GPD file.

In step S1102, the MXDW 120 refers to the capability information file 134 and acquires capability information of the printing apparatus. Here, the MXDW 120 also acquires pattern resolution information. FIG. 12 illustrates a GPD file as an example of the capability information file 134 according to the present embodiment, and gives an excerpt (Feature: PatternResolution) describing a pattern resolution setting. Only one pattern resolution (300 dpi) that can be set in the printing apparatus is described.

In step S1103, the MXDW 120 converts GDI drawing data to XPS drawing data. For a pattern drawing, GDI drawing commands are converted to XPS drawing commands in accordance with the only one pattern resolution described in the GPD file.

Figure 8:
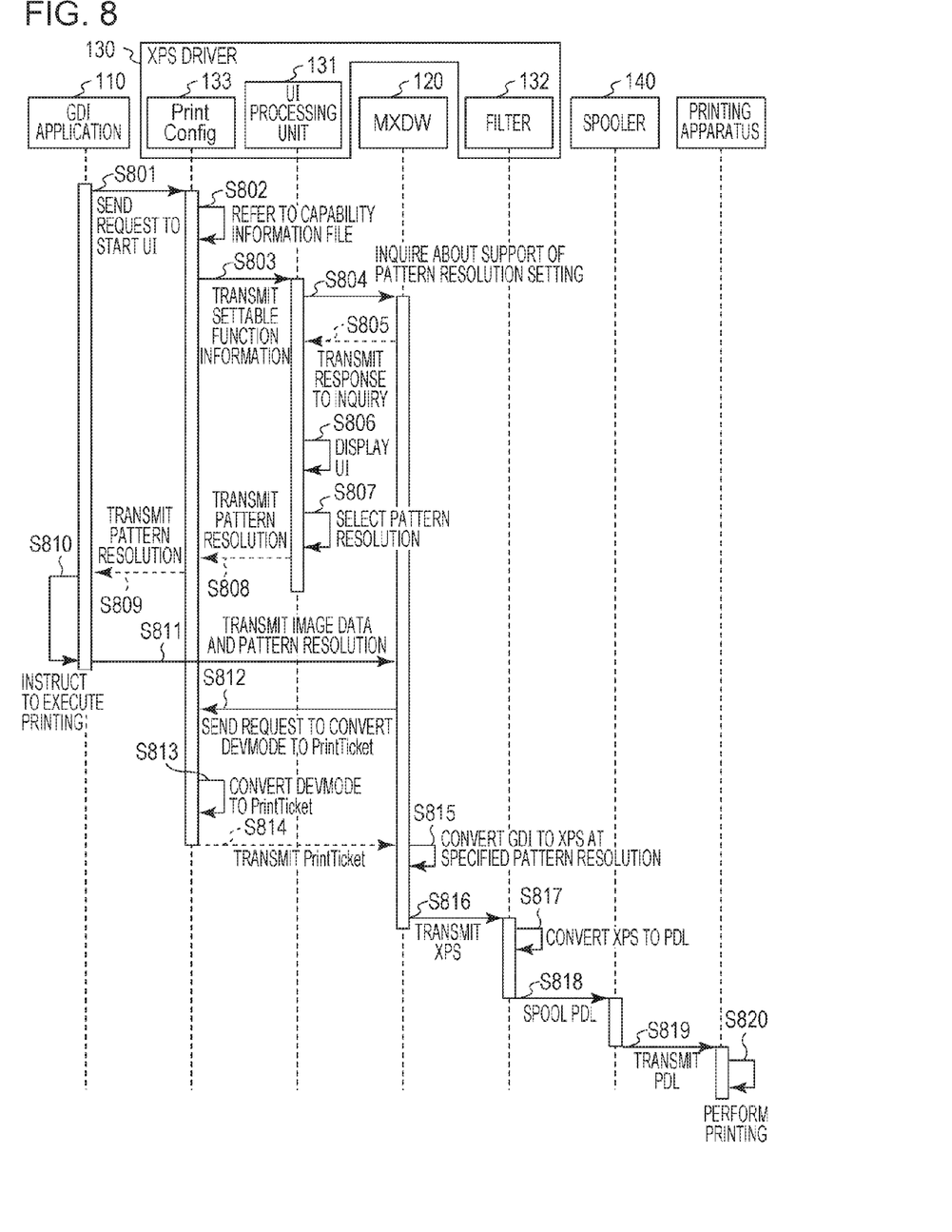
FIG. 8 is a sequence diagram illustrating a printing process performed when an MXDW supports an arbitrary pattern resolution setting according to the first embodiment.
Figure 9A:
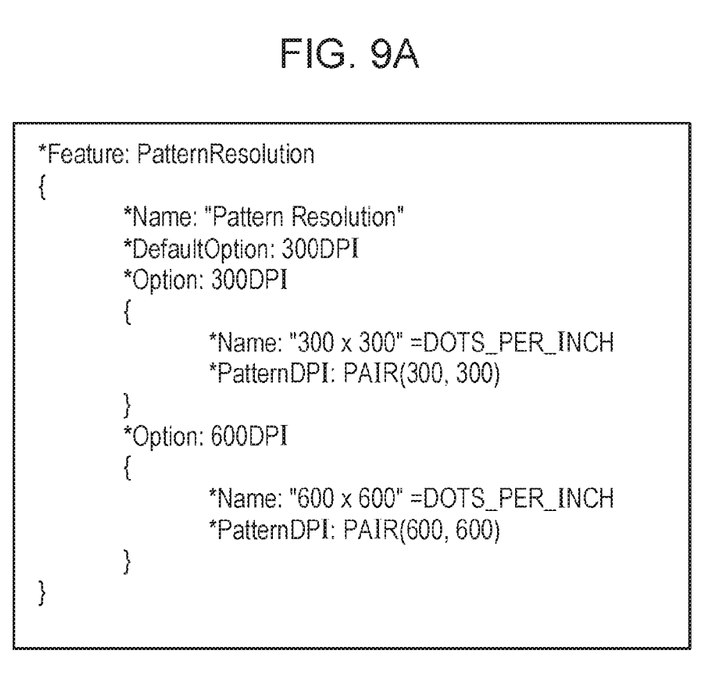
FIG. 9A illustrates a GPD file.
Figure 9B:
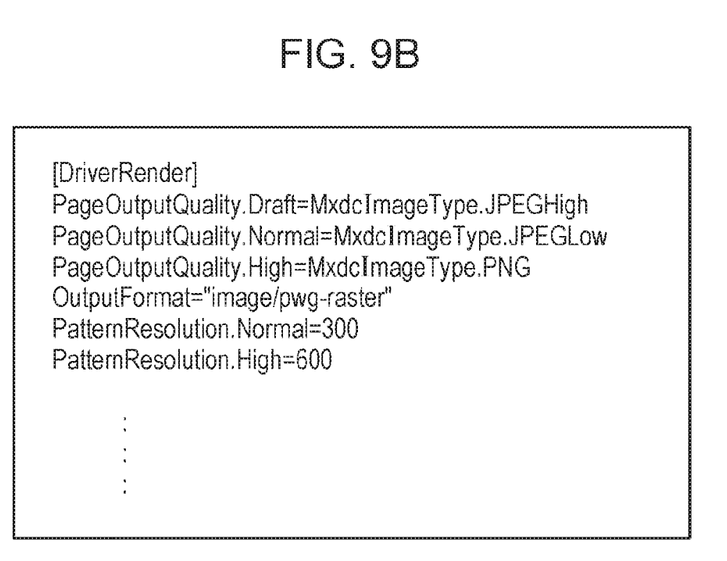
FIG. 9B illustrates a manifest file.

The operation in each of the subsequent steps S1104 to S1108 will not be described here, as steps S1104 to S1108 correspond to steps S816 to S820 in the sequence diagram of FIG. 8 in the first embodiment.

The printing process described above is one that is performed when the MXDW 120 supports only one pattern resolution setting. When the MXDW 120 does not support an arbitrary pattern resolution setting, pattern resolution information cannot be interpreted in the first place, even by referring to the GPD file. Therefore, conversion is performed at a fixed resolution (e.g., 150 dpi) set by default in the MXDW 120.

When there is only one selectable pattern resolution as described above, the MXDW 120 may directly refer to (read out) and process pattern resolution information described in a capability information file, such as a GPD file.

As described above, when the pattern resolution does not have multiple options, the MXDW 120 may directly read out a pattern resolution from the capability information file 134 to perform conversion.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-230775 filed Nov. 26, 2015, which is hereby incorporated by reference herein in its entirety.

What is claimed is:

1. An information processing apparatus comprising:
a processor; and
a memory for storing a graphics device interface application, a conversion module and a printer driver,
wherein the processor executes the graphics device interface application to issue GDI (graphics device interface) drawing commands in accordance with a print instruction, and
wherein the processor executes the conversion module to generate XPS (extensible markup language paper specification) drawing commands by converting the issued GDI drawing commands, and
wherein the processor executes the printer driver to generate print data based on the generated XPS drawing commands,
wherein if the issued GDI drawing commands include a pattern drawing command for filling a figure with a pattern, the conversion module obtains information of a resolution specified by the printer driver and generates the XPS drawing commands by converting the issued GDI drawing commands and setting a pattern resolution of the pattern drawing command based on the obtained information of the resolution specified by the printer driver.

2. The information processing apparatus according to claim 1, wherein the printer driver includes a user interface processing module for displaying a user interface that allows a user to select the specified resolution of the pattern drawing, and
the conversion module obtains information of the resolution specified via the user interface and generates the XPS drawing commands by converting the issued GDI drawing commands and setting the pattern resolution of the pattern drawing command based on the obtained information of the specified resolution.

3. The information processing apparatus according to claim 2, wherein the user interface processing module displays the user interface by referring to a capability information file describing information about a capability of a printing apparatus, the information including information of at least one selectable pattern resolution.

4. The information processing apparatus according to claim 3, wherein if one pattern resolution is described in the capability information file as a selectable pattern resolution, the user interface processing module does not display the user interface or disables selection of a pattern resolution in the user interface, and the conversion module directly refers to the capability information file and generates the XPS drawing command by converting the GDI drawing commands and setting the pattern resolution of the pattern drawing command based on the one pattern resolution described in the referred capability information file.

5. The information processing apparatus according to claim 3, wherein the capability information file is a generic printer description file or a manifest file.

6. The information processing apparatus according to claim 2, wherein if the conversion module does not support a pattern resolution setting based on the information of the resolution specified by the printer driver, or if a pattern resolution is not specified in the user interface, the conversion module generates the XPS drawing commands by converting the issued GDI drawing commands and setting the pattern resolution of the pattern drawing based on a pattern resolution set by default in the conversion module.

7. The information processing apparatus according to claim 1, wherein the printer driver transmits the information of the specified resolution to the conversion module using a PrintTicket; and
the conversion module obtains the PrintTicket that describes the information of the specified resolution and generates the XPS drawing commands by converting the issued GDI drawing commands and setting the pattern resolution of the pattern drawing command based on the information of the specified resolution described in the PrintTicket.

8. The information processing apparatus according to claim 1, wherein the printer driver determines whether the conversion module supports a pattern resolution setting based on the obtained information of the resolution specified by the printer driver.

9. The information processing apparatus according to claim 8, wherein the determining unit performs the determination in response to an inquiry to the conversion module made using a dedicated application programming interface.

10. The information processing apparatus according to claim 8, wherein the determining unit performs the determination by comparing version information of the conversion module that can support the pattern resolution setting based on the information of the resolution specified by the printer driver with version information acquired from the conversion module.

11. A non-transitory computer-readable storage medium storing a conversion program that causes a computer to perform:
  generating XPS drawing commands by converting GDI (graphics device interface) drawing commands issued by a GDI (graphics device interface) application, wherein if the issued GDI drawing commands include a pattern drawing command for filling a figure with a pattern, the XPS drawing commands are generated by converting the issued GDI drawing commands and setting a pattern resolution of the pattern drawing command on the basis of information of a resolution specified by a printer driver; and
  transmitting the generated XPS drawing commands to the printer driver, wherein the printer driver generates print data on the basis of the transmitted XPS drawing commands.

12. A non-transitory computer-readable storage medium storing a printer driver program that causes a computer to perform:
  displaying a user interface for a user to select a pattern resolution;
  transmitting the pattern resolution selected via the user interface to a conversion module, wherein the conversion module generates XPS drawing commands by converting GDI drawing commands issued by a GDI application and setting a pattern resolution of a pattern drawing command on the basis of the transmitted pattern resolution if the GDI drawing commands include the pattern drawing command for filling a figure with a pattern; and
  generating print data on the basis of the XPS drawing commands obtained from the conversion module.

* * * * *